United States Patent
Pagano

(10) Patent No.: US 9,131,798 B2
(45) Date of Patent: Sep. 15, 2015

(54) BREWING APPARATUS FOR A MACHINE FOR PREPARING BEVERAGES

(75) Inventor: Gaetano Pagano, Firenze (IT)

(73) Assignee: LUIGI LAVAZZA S.P.A., Turin (IT)

( * ) Notice: Subject to any disclaimer, the term of this patent is extended or adjusted under 35 U.S.C. 154(b) by 358 days.

(21) Appl. No.: 13/701,077

(22) PCT Filed: May 31, 2011

(86) PCT No.: PCT/IB2011/052376
§ 371 (c)(1),
(2), (4) Date: Nov. 30, 2012

(87) PCT Pub. No.: WO2011/151781
PCT Pub. Date: Dec. 8, 2011

(65) Prior Publication Data
US 2013/0068111 A1 Mar. 21, 2013

(30) Foreign Application Priority Data

Jun. 1, 2010 (IT) .............................. TO2010A0460

(51) Int. Cl.
A47J 31/36 (2006.01)
A47J 31/10 (2006.01)

(52) U.S. Cl.
CPC .............. *A47J 31/10* (2013.01); *A47J 31/3633* (2013.01); *A47J 31/3638* (2013.01); *A47J 31/3623* (2013.01)

(58) Field of Classification Search
CPC ..................... A47J 31/3638; A47J 31/3623
USPC ........................ 99/289 R, 295, 302 P, 302 R
See application file for complete search history.

(56) References Cited

U.S. PATENT DOCUMENTS

| | | | | |
|---|---|---|---|---|
| 5,776,527 A | * | 7/1998 | Blanc | 426/77 |
| 8,079,300 B2 | * | 12/2011 | Jing | 99/289 R |
| 8,613,246 B2 | * | 12/2013 | Ryser et al. | 99/289 R |
| 2009/0007794 A1 | * | 1/2009 | Cortese | 99/289 R |
| 2010/0101428 A1 | | 4/2010 | Fin | |

FOREIGN PATENT DOCUMENTS

| | | |
|---|---|---|
| WO | 2006/005736 A2 | 1/2006 |
| WO | 2010/032271 A1 | 3/2010 |
| WO | 2010/076765 A2 | 7/2010 |

OTHER PUBLICATIONS

International Search Report of PCT/IB2011/052376 dated Aug. 1, 2011.

* cited by examiner

*Primary Examiner* — Reginald L Alexander
(74) *Attorney, Agent, or Firm* — Sughrue Mion, PLLC

(57) ABSTRACT

The brewing apparatus (1) comprises a guide and support structure (2), that bears a movable receiving assembly (7) capable of receiving a capsule or similar (10), containing a quantity or measure of a substance for the preparation of a beverage, and a substantially stationary cooperating assembly (6). The movable assembly (7) is able to assume a closed position in which it is coupled with the cooperating assembly (6) to create a brewing chamber, and a separated open position. Between such assemblies (6, 7) there is a gripping device (20) including a pair of movable jaws, capable of assuming a relative retaining position in which they are capable of receiving and retaining a capsule or similar (10) inserted between said assemblies (6, 7) while the latter are in the separated open position. The jaws (21) can be parted by respective pusher members (23) of the movable assembly (7) to release the capsule (10) retained, when the receiving assembly (7) is at least close to the closed position, to allow a capsule (10) to be positioned in the brewing chamber.

7 Claims, 5 Drawing Sheets ically, the invention with an apparatus of the type specified above, characterized primarily in that the pusher members are provided with respective transversely protruding parting formations having respective first and second pushing surfaces capable of parting said jaws when the movable receiving assembly moves towards and away from the closed position, respectively.
BREWING APPARATUS FOR A MACHINE FOR PREPARING BEVERAGES

CROSS REFERENCE TO RELATED APPLICATIONS

This application is a National Stage of International Application No. PCT/IB2011/052376 filed May 31, 2011, claiming priority based on Italian Patent Application No. TO2010A000460 filed Jun. 1, 2010, the contents of all of which are incorporated herein by reference in their entirety.

BACKGROUND OF THE INVENTION

1. Field of the Invention

This invention relates to a brewing apparatus for a machine for preparing beverages, in particular coffee.

2. Background

More specifically the invention relates to a brewing apparatus comprising an operationally stationary guide and support structure, that bears a hollow movable receiving assembly capable of receiving a capsule or similar, containing a quantity or measure of a substance for the preparation of a beverage, and a substantially stationary cooperating assembly; the movable assembly being able to assume, relative to the cooperating assembly, a closed position in which said assemblies are coupled together to create a brewing chamber, and a separated open position; between said assemblies there being provided a gripping device, including a pair of oscillating jaws, capable of assuming a relative retaining position in which they are capable of receiving and retaining a capsule or similar inserted between said assemblies while the latter are in the separated open position; it being possible for said jaws to be parted by respective pusher members of the movable assembly to release the capsule retained, when said receiving assembly is at least close to the closed position, to allow that capsule to be positioned in the brewing chamber.

One purpose of this invention is to propose such an improved brewing assembly.

SUMMARY OF THE INVENTION

This and other objectives are achieved according to the invention with an apparatus of the type specified above, characterized primarily in that the pusher members are provided with respective transversely protruding parting formations having respective first and second pushing surfaces capable of parting said jaws when the movable receiving assembly moves towards and away from the closed position, respectively.

In such a brewing apparatus the arrangement is in particular such that the parting formations are able to move past the jaws when the movable receiving assembly moves towards the closed position, and to move back past the jaws in the opposite direction when the movable receiving assembly moves away from the closed position.

Advantageously, the pusher members are mounted slidingly on respective guides, parallel to the direction of movement of the movable receiving assembly, under the action of elastic means tending to push them towards the cooperating assembly.

Such elastic means are in particular arranged to push the pusher members, and the associated parting formations, towards and against the jaws when the receiving assembly approaches the closed position.

The arrangement is advantageously such that when the movable receiving assembly approaches the closed position, the pusher members bear against the jaws without triggering their parting until the movement of the movable receiving assembly has generated a predetermined degree of compression in the elastic means associated with the pusher members.

BRIEF DESCRIPTION OF THE DRAWINGS

Further characteristics and advantages of the invention are set out in the detailed description below, provided purely as a non-limiting example, with reference to the attached drawings, in which.

DETAILED DESCRIPTION OF THE PREFERRED EMBODIMENT OF THE INVENTION

Figure 1:
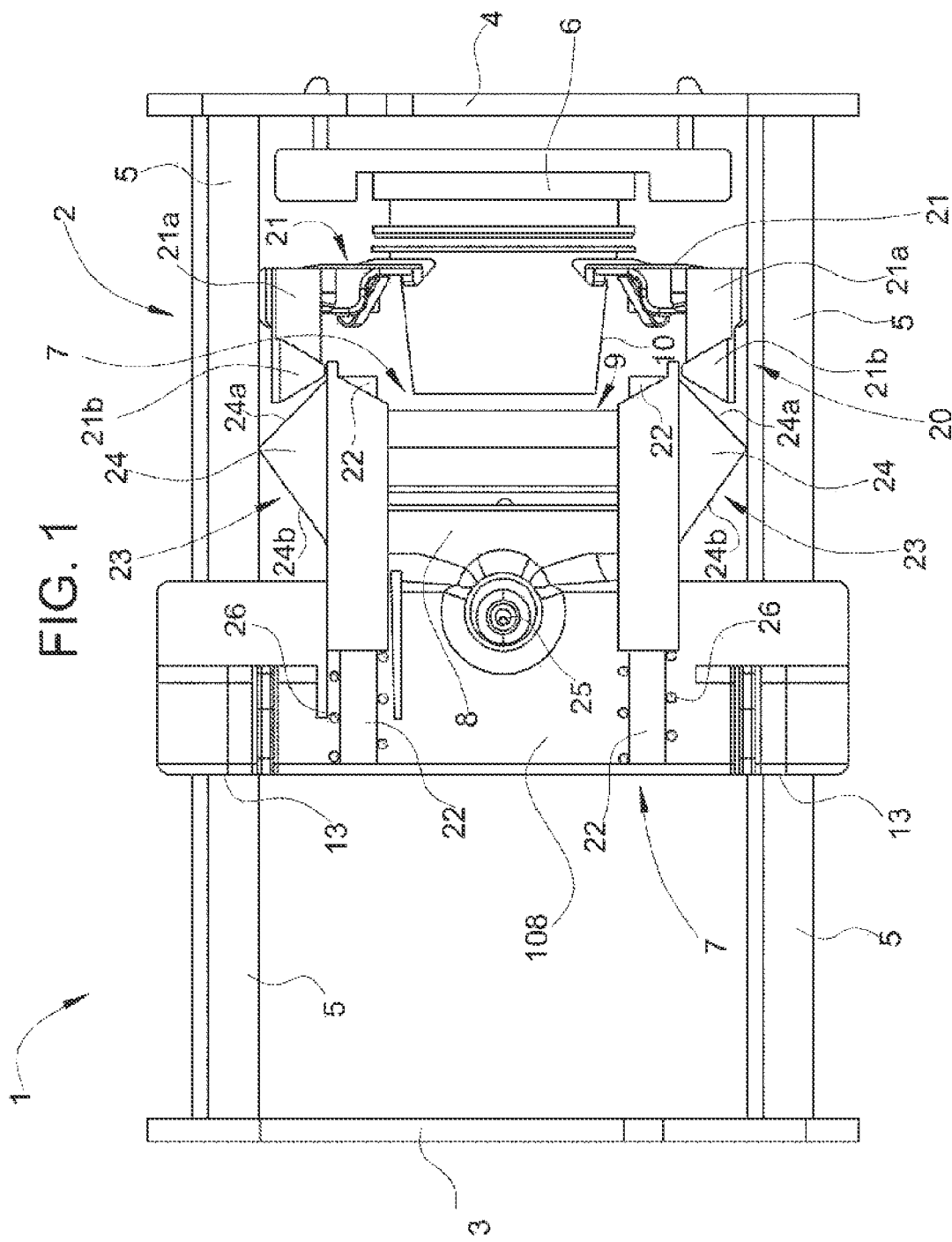
FIG. 1 is a plan view from below of a brewing assembly according to this invention.

In the drawings a brewing apparatus according to this invention for a machine for preparing beverages, in particular hot beverages, such as coffee, is marked as a whole as 1. Such a brewing apparatus 1 is intended to be built into a machine for preparing beverages of a type known and therefore not illustrated.

In the embodiment illustrated by way of example the brewing assembly 1 includes an operationally stationary support and guide structure 2 including two header plates 3 and 4, facing one another, and interconnected by means of a pair of parallel rods 5, preferably cylindrical.

The bearing structure 2 supports a cooperating assembly, marked as a whole as 6, which is substantially stationary in operation, and an associated movable receiving assembly 7. These assemblies 6 and 7 face one another.

The receiving assembly 7 is movable along the rods 5, from and towards the cooperating assembly 6, and includes an essentially cup-shaped hollow body 8. This body 8 contains a cavity 9 able to accommodate a pod or a capsule 10, or similar, containing a quantity or measure of a substance for preparing a beverage, such as ground roasted coffee.

Figure 2:
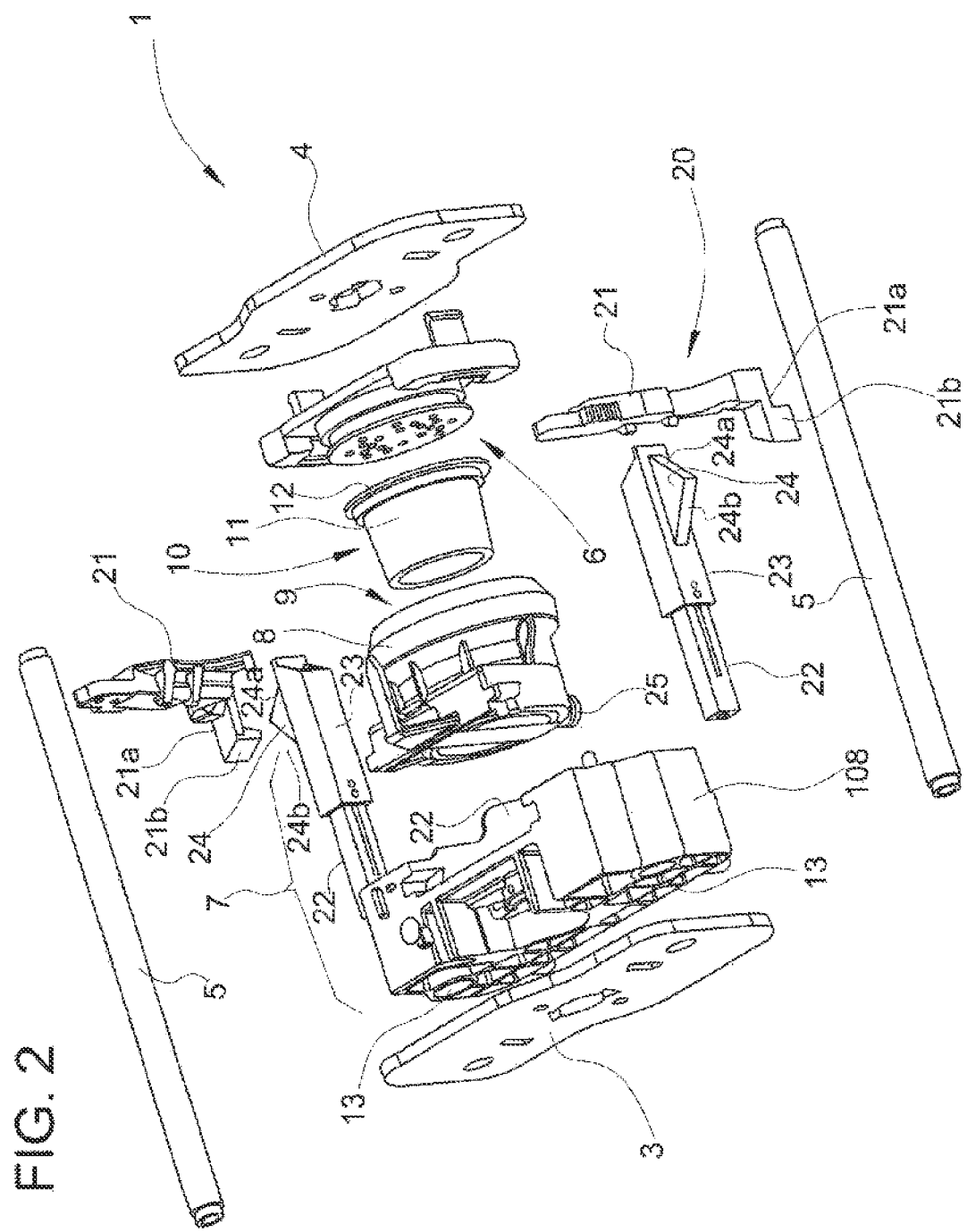
FIG. 2 is an exploded perspective three-quarter top view of the brewing apparatus according to FIG. 1.

The capsule 10 shown in the drawings is of a known type, and comprises a cup body 11, for example made of moulded plastic, closed by a sealing cover 12, whose edge protrudes radially (see in particular FIG. 2).

The cooperating assembly 6 is connected to the end plate 4, while the movable receiving assembly 7 is assembled movingly along the rods 5.

In the embodiment shown by way of example the movable assembly 7 comprises a main body 108, for example made of moulded plastic, assembled slidingly along the interconnection and guide rods 5, and having an essentially U-shaped retaining formation 22 (see in particular FIG. 2), in which is assembled detachably the body 8 intended to receive a capsule or pod 10. With regard to the separability of the body 8 from the main body 108, the solution illustrated essentially matches the solution set out in the existing Italian patent application TO2008A001007, filed by the same applicant.

Two parallel through-holes 13 are made in the main body 108, through which extend the rods 5 (see in particular FIG. 2).

The movement of the movable assembly 7 towards the cooperating element 6 is advantageously commandable using a known actuating device, for example an electrical linear actuator. The return movement can be commanded using elastic means.

The arrangement is such that the movable assembly 7 is able to assume, in relation to the cooperating assembly 6, an open position (FIG. 1), in which in the space between the assemblies 6 and 7 it is possible to insert a capsule or pod 10 for preparing a beverage. The movable assembly 7 is also able to assume a closed position (FIG. 3) in which it is coupled in a liquid-tight manner to the cooperating assembly 6, such as to create a brewing chamber into which is placed a capsule or pod 10.

In a known manner, the cooperating assembly 6 is able to inject a stream of hot water and/or steam into this brewing chamber, to prepare the beverage. The beverage obtained through brewing may therefore be discharged towards an underlying recipient, for example a cup, through a dispensing pipe 25, communicating with the brewing chamber, and protruding from beneath the body 8.

Between the movable receiving assembly 7 and the cooperating assembly 6, in particular close to the latter, there is a gripping device indicated as a whole as 20. This device includes, in a known manner, a pair of jaws 21, assembled transversely and oscillatingly on the rods 5.

In a known manner (see for example international patent application WO 2006/005736 A2), the jaws 21 are able to assume a relative retaining position (shown in FIGS. 1 and 3), in which they are able to receive and retain a capsule or pod 10 inserted between the assemblies 7 and 6 while these latter are in the separated open state.

Two longitudinal guides 22, parallel to the rods 5, are attached to the lower part of the body 108 of the movable assembly 7. On said guides 22 are assembled slidingly respective pusher members, each marked as a whole as 23.

The pusher members 23 are provided with respective parting formations 24, protruding transversely from their sides oriented towards the rods 5. In the embodiment illustrated the parting formations 24 have, in plan view, an essentially triangular shape.

The formations 24 are intended to part the jaws 21 when the movable receiving assembly 7 approaches the closed position against the cooperating assembly 6.

The parting formations 24 have in particular a triangular cusp shape, with a first inclined lateral surface 24a oriented towards a corresponding jaw 21, and a second inclined lateral surface 24b oriented towards the main body 108 of the movable assembly 7.

The jaws 21 have respective lower arms 21a, terminating in respective protuberances 21b of essentially triangular section.

With reference for example to FIG. 1, when the lateral surfaces 24a, 24b of the parting formations 24 converge pointing outwards, the terminal protuberances 21b of the jaws 21 have respective lateral faces or surfaces that converge together pointing inwards.

Figure 3:
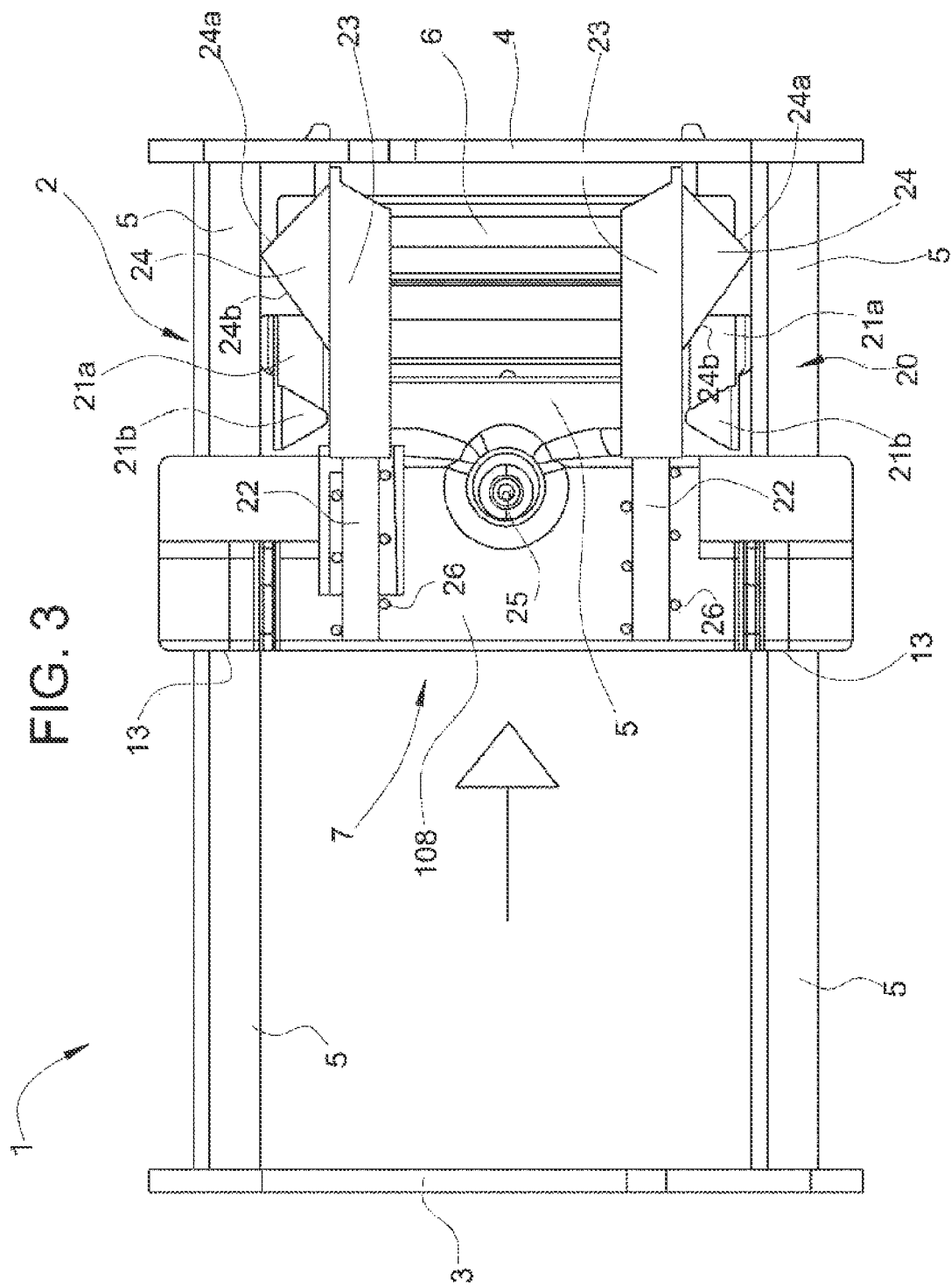
FIGS. 3 to 5 are views similar to that shown in FIG. 1 showing the brewing apparatus in successive operating states.

With reference for example to FIGS. 1 and 3, the pusher members 23 are associated with the respective coil springs 26. In the embodiment illustrated these springs are arranged around the corresponding guides 22, and tend to push the members 23 towards the stationary cooperating assembly 6.

With reference to FIG. 1, when the movable assembly 7 is in open position, the springs 26 tend to hold the pusher members 23 and the associated parting formations 24 towards and against the terminal appendices 21b of the jaws 21.

When preparing a beverage, a capsule or pod 10 is inserted in the space between the assemblies 6 and 7, and is held by the jaws 21 in a state substantially aligned axially with those assemblies, as shown in FIG. 1.

Activation of the actuator associated with the movable assembly 7 then causes the movement of the latter towards the cooperating assembly 6. In the initial movement phase of the assembly 7, the pusher members 23 remain caught against the terminal protuberances 21a of the jaws 21, while the springs 26, which are relatively weak, are compressed. In this phase, the movement of the movable assembly 7 is such that the associated body 8 starts to encircle the bottom portion of the pod or capsule 10 opposite the cooperating assembly 6.

Following an at least partial interpenetration between the body 8 and the pod or capsule 10, the subsequent movement of the movable assembly 7 towards the cooperating assembly 6 determines a positive advancement of the pusher members 27, which by means of the respective formations 24 cause a parting of the jaws 21, which oscillate around the rods 5. On account of said parting, the jaws 21 release the capsule or pod 10, which remains however held in substantial alignment with the cooperating assembly 6 on account of its coupling with the cavity 9 of the body 8 of the movable assembly 7.

This parting occurs when the movable assembly 7 is near to the closed state. Before the closed state is reached, the parting formations 24 of the pusher members 23 move past the terminal formations 21b of the jaws 21, and, pushed by the associated springs 26, butt against the endplate 4, as shown in FIG. 3.

Once the movable assembly 7 has closed against the cooperating assembly 6, the latter in a known manner enables the injection of hot water and or steam into the brewing chamber, having first perforated the cover and the base of the capsule or pod 10.

The beverage obtained is poured into a collection recipient, through a dispensing pipe 25.

Figure 4:
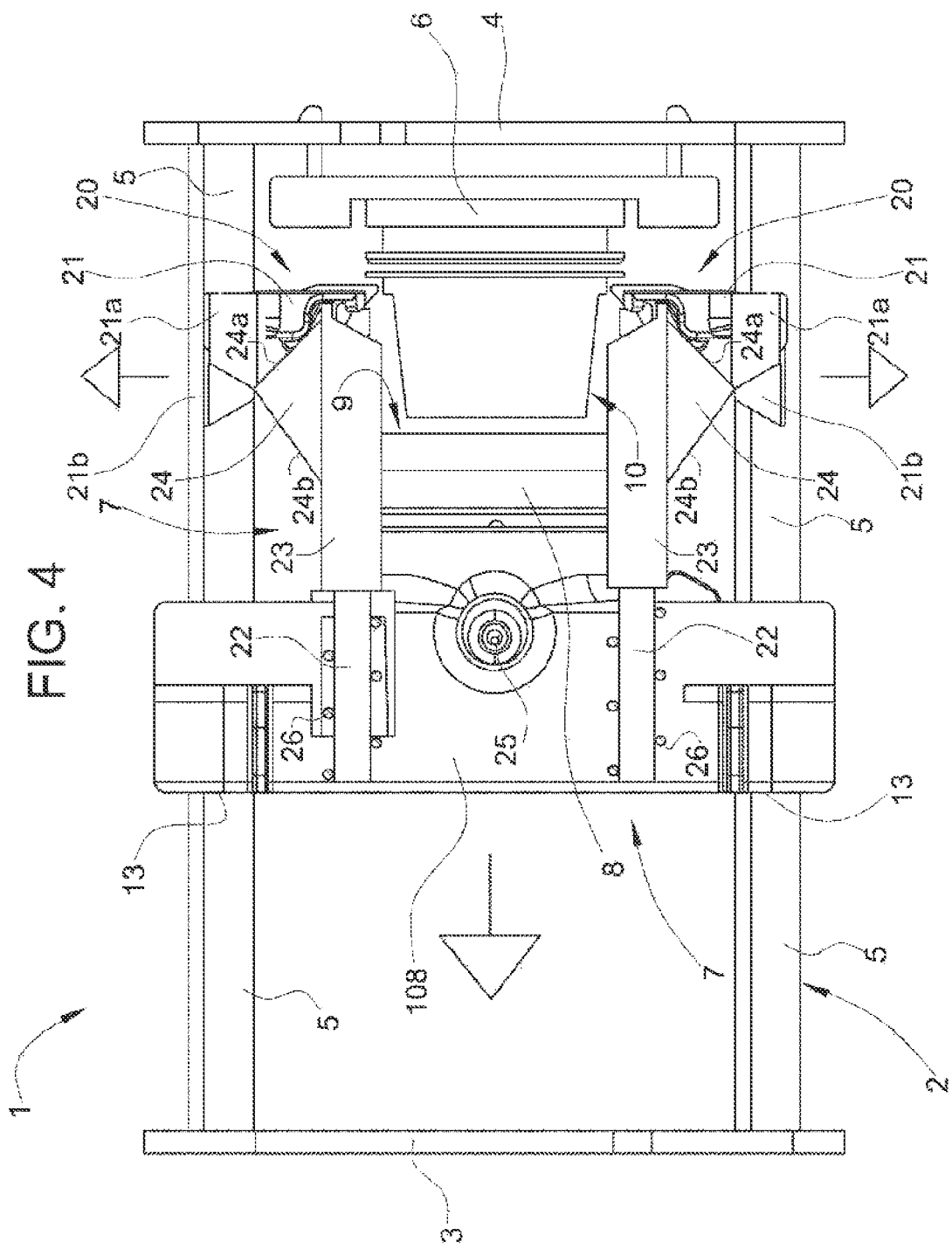

Once the beverage has been dispensed, the movable assembly 7 is caused in a known manner to return from the closed state to the open state. In the course of this movement, the pusher members 23, driven by the guides 22, interact with the terminal formations 21b of the jaws 21, at the pushing surfaces 24b themselves. As shown in FIG. 4, this causes a new parting of the jaws 21 as soon as the used capsule or pod 10 is disengaged from the cavity of the body 8 of the movable assembly 7 (FIG. 4). In this state, the used capsule or pod 10 is held neither by the jaws 21 nor by the body 8 and can therefore fall under the action of gravity towards a collection container.

Figure 5:
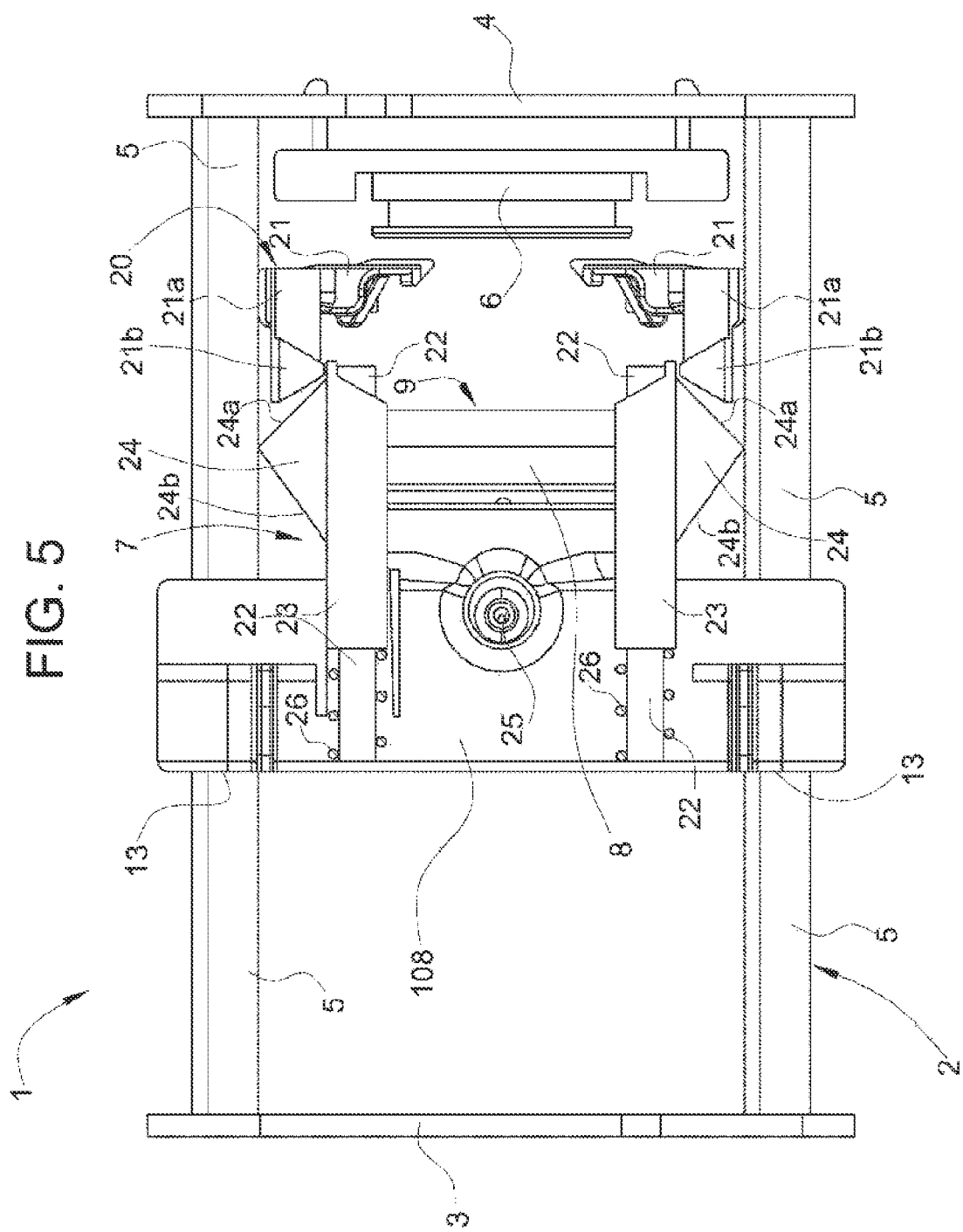

Following the subsequent movement of the movable assembly 7 towards the open state, the parting formations 24 of the pusher members 23 move back, this time in the opposite direction to the previous move, past the terminal formations 21b of the jaws 21, which may be returned to the close state by an associated spring (not shown) with a view to receiving a subsequent capsule or pod for the preparation of another beverage (FIG. 5).

Naturally, notwithstanding the invention principle, the means of implementation and the specific embodiments may vary greatly from that described and illustrated purely by way of non-limiting example, without thereby moving outside the scope of the invention as defined in the attached claims.

The invention claimed is:

1. A brewing apparatus (1) for a machine for preparing beverages, comprising:
   an operationally stationary guide and support structure (2), that bears a movable receiving assembly (7) configured to receive a capsule or similar (10), containing a quantity or measure of a substance for the preparation of a beverage;
   a substantially stationary cooperating assembly (6), movable receiving assembly (7) being configured to assume a closed position in which it is coupled with the stationary cooperating assembly (6) to create with this a brewing chamber, and a separated open position;

a gripping device between said stationary cooperating assembly and said movable receiving assemblies (6, 7), the gripping device (20) including a pair of movable jaws, configured to assume a relative retaining position in which they are configured to receive and retain a capsule or similar (10) inserted between said assemblies (6, 7) while the latter are in the separated open position, said jaws (21) being operable to be parted by respective pusher members (23) of the movable receiving assembly (7) to release the capsule (10) retained, when said movable receiving assembly (7) is at least close to the closed position, to allow the capsule (10) to be positioned in the brewing chamber, wherein the pusher members (23) are provided with respective transversely protruding parting formations (24) having respective first and second pushing surfaces (24a, 24b) configured to part said jaws (21) when the movable receiving assembly (7) moves towards and away from the closed position, respectively, and wherein that the parting formations (24) are configured to move past the jaws (21) when the movable receiving assembly (7) reaches the closed position, and to move back past the jaws (21) in the opposite direction when the movable receiving assembly (7) moves away from the closed position.

2. The brewing apparatus according to claim 1, wherein the parting formations (24) of said pusher members (23) are shaped like triangular cusps.

3. The brewing apparatus according to claim 1, wherein the pusher members (23) are mounted slidingly on respective guides (22), parallel to the direction of movement of the movable receiving assembly (7), under the action of elastic means (26) tending to push them towards the stationary cooperating assembly (6).

4. The brewing apparatus according to claim 3, wherein said elastic means (26) tend to push the pusher members (23) in associated parting formations (24) towards and against the jaws (21) when the movable receiving assembly (7) approaches the closed position.

5. The brewing apparatus according to claim 4, wherein when the movable receiving assembly (7) approaches the closed position, the pusher members (23) bear against the jaws (21) without substantially triggering their parting, until the movement of said movable receiving assembly (7) has generated a predetermined degree of compression in the elastic means (26) associated with said pusher member (23).

6. The brewing apparatus according to claim 5, wherein said elastic means (26) comprise coil springs (26) interposed between the pusher members (23) and the movable receiving assembly (7).

7. A brewing apparatus (1) for a machine for preparing beverages, comprising:

an operationally stationary guide and support structure (2), that bears a movable receiving assembly (7) configured to receive a capsule or similar (10), containing a quantity or measure of a substance for the preparation of a beverage;

a substantially stationary cooperating assembly (6), the movable receiving assembly (7) being configured to assume a closed position in which it is coupled with the stationary cooperating assembly (6) to create with this a brewing chamber, and a separated open position; and a gripping device between said stationary cooperating assembly and said movable receiving assemblies (6, 7), the gripping device (20) including a pair of movable jaws, configured to assume a relative retaining position in which they are configured to receive and retain a capsule or similar (10) inserted between said assemblies (6, 7) while the latter are in the separated open position, said jaws (21) being operable to be parted by respective pusher members (23) of the movable receiving assembly (7) to release the capsule (10) retained, when said movable receiving assembly (7) is at least close to the closed position, to allow the capsule (10) to be positioned in the brewing chamber, wherein the pusher members (23) are provided with respective transversely protruding parting formations (24) having respective first and second pushing surfaces (24a, 24b) configured to part said jaws (21) when the movable receiving assembly (7) moves towards and away from the closed position, respectively, and wherein the pusher members (23) are mounted slidingly on respective guides (22), parallel to the direction of movement of the movable receiving assembly (7), under the action of elastic means (26) tending to push them towards the stationary cooperating assembly (6).

* * * * *